US010069921B1

(12) United States Patent
Colston

(10) Patent No.: US 10,069,921 B1
(45) Date of Patent: Sep. 4, 2018

(54) CLOUD SYSTEM FOR CONTROLLING OUTDOOR GRILL WITH MOBILE APPLICATION

(71) Applicant: Traeger Pellet Grills, LLC, Salt Lake City, UT (US)

(72) Inventor: Michael Colston, Salt Lake City, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 0 days.

(21) Appl. No.: 15/954,199

(22) Filed: Apr. 16, 2018

Related U.S. Application Data

(63) Continuation of application No. 15/511,319, filed as application No. PCT/US2016/026736 on Apr. 8, (Continued)

(51) Int. Cl.
*G06F 15/16* (2006.01)
*H04L 29/08* (2006.01)
(Continued)

(52) U.S. Cl.
CPC ......... *H04L 67/125* (2013.01); *G06Q 30/012* (2013.01); *G06Q 30/0267* (2013.01);
(Continued)

(58) Field of Classification Search
None
See application file for complete search history.

(56) References Cited

U.S. PATENT DOCUMENTS

| 4,036,995 A | 7/1977 | Koether |
| 4,409,662 A | 10/1983 | Rao |

(Continued)

FOREIGN PATENT DOCUMENTS

| CN | 202392848 | 8/2012 |
| CN | 203914599 | 11/2014 |

(Continued)

OTHER PUBLICATIONS

International Search Report for application No. PCT/US2016/039271 dated Sep. 23, 2016.
(Continued)

*Primary Examiner* — Brian Whipple
(74) *Attorney, Agent, or Firm* — Workman Nydegger

(57) ABSTRACT

A cloud computing system for use in remote cooking can receive a first input from a computing system indicating that an electronically-controlled appliance is permitted to communicate with a cloud computing platform. The computer system generates a notification that is to be sent to a software application, where the software application is configured to control functions of the electronically-controlled appliance. The computer system transmits the generated notification to the software application, where the generated notification indicates that the cloud computing platform is communicably connected to the electronically-controlled appliance. The computer system then receives a second input from the software application indicating that specified functions are to be performed on the electronically-controlled appliance, and transmits instructions to the electronically-controlled appliance to perform the specified functions. These functions are then interpreted and carried out by a hardware controller on the electronically-controlled appliance.

30 Claims, 6 Drawing Sheets

Related U.S. Application Data 2016, application No. 15/954,199, which is a continuation-in-part of application No. 15/510,996, filed as application No. PCT/US2016/024737 on Mar. 29, 2016, application No. 15/954,199, which is a continuation-in-part of application No. 15/114,744, filed as application No. PCT/US2016/039271 on Jun. 24, 2016.

(60) Provisional application No. 62/245,549, filed on Oct. 23, 2015, provisional application No. 62/245,535, filed on Oct. 23, 2015, provisional application No. 62/245,530, filed on Oct. 23, 2015.

(51) Int. Cl.
- *G08B 21/18* (2006.01)
- *G06Q 30/02* (2012.01)
- *G06Q 30/00* (2012.01)
- *G08C 17/02* (2006.01)

(52) U.S. Cl.
CPC .......... *G08B 21/18* (2013.01); *G08B 21/185* (2013.01); *G08C 17/02* (2013.01)

(56) References Cited

U.S. PATENT DOCUMENTS

| | | |
|---|---|---|
| 4,474,107 A | 10/1984 | Cothran |
| 4,837,414 A | 6/1989 | Edamula |
| 5,360,965 A | 11/1994 | Ishii et al. |
| D605,216 S | 12/2009 | Nakano |
| 7,663,502 B2 | 2/2010 | Breed |
| 7,703,389 B2 | 4/2010 | McLemore |
| 7,707,606 B2 | 4/2010 | Hofrichter et al. |
| 7,743,012 B2 | 6/2010 | Chambers et al. |
| 7,937,484 B2 | 5/2011 | Julia et al. |
| 8,091,543 B2 | 1/2012 | Baumann et al. |
| 8,766,144 B2 | 7/2014 | McLoughlin et al. |
| 8,855,793 B2 | 10/2014 | Bhargava |
| 8,931,400 B1 | 1/2015 | Allen |
| 9,149,058 B2 | 10/2015 | Bilet et al. |
| 9,414,444 B2 | 8/2016 | Libman et al. |
| 2005/0262226 A1* | 11/2005 | Holloway .............. G08C 19/28 709/221 |
| 2006/0041655 A1* | 2/2006 | Holloway ................ G06F 1/18 709/223 |
| 2006/0144384 A1 | 7/2006 | Santagata |
| 2006/0254432 A1 | 11/2006 | McLemore |
| 2007/0001012 A1 | 1/2007 | Kim et al. |
| 2007/0012307 A1 | 1/2007 | Wiker |
| 2010/0134620 A1 | 6/2010 | Bielstein |
| 2010/0147823 A1 | 6/2010 | Anderson |
| 2010/0247721 A1 | 9/2010 | McGhee |
| 2011/0002677 A1 | 1/2011 | Cochran et al. |
| 2012/0116820 A1 | 5/2012 | English et al. |
| 2012/0170247 A1 | 7/2012 | Do |
| 2012/0210268 A1 | 8/2012 | Hilbrink |
| 2012/0278454 A1 | 11/2012 | Stewart |
| 2012/0310416 A1 | 12/2012 | Tepper et al. |
| 2013/0061765 A1 | 3/2013 | Reinhart |
| 2013/0171304 A1 | 7/2013 | Huntley |
| 2013/0188097 A1 | 7/2013 | Smith |
| 2013/0265159 A1 | 10/2013 | Durian |
| 2013/0277353 A1 | 10/2013 | Joseph |
| 2014/0148969 A1 | 5/2014 | Graziano et al. |
| 2014/0170275 A1 | 6/2014 | Bordin |
| 2014/0295822 A1 | 10/2014 | Koo |
| 2014/0326233 A1 | 11/2014 | Traeger |
| 2015/0025687 A1 | 1/2015 | Henderson et al. |
| 2015/0056344 A1 | 2/2015 | Luckhardt |
| 2015/0229713 A1 | 8/2015 | Lu et al. |
| 2015/0285513 A1 | 10/2015 | Matarazzi et al. |
| 2015/0304157 A1 | 10/2015 | Kim et al. |
| 2016/0147207 A1 | 5/2016 | Park |
| 2016/0335874 A1 | 11/2016 | Allen |
| 2017/0176019 A1 | 6/2017 | Bhogal et al. |
| 2017/0289257 A1 | 10/2017 | Colston |

FOREIGN PATENT DOCUMENTS

| | | |
|---|---|---|
| DE | 102008043722 | 5/2010 |
| DE | 102012204229 | 9/2013 |
| EP | 0298858 | 11/1990 |
| EP | 0899512 | 3/1999 |
| JP | 2015017711 | 1/2015 |
| KR | 1020020036478 | 5/2002 |
| KR | 1020140008927 | 1/2014 |
| KR | 101457087 | 10/2014 |
| KR | 1020140135318 | 11/2014 |
| KR | 101534514 | 6/2015 |
| WO | 2012171242 | 12/2012 |
| WO | 2017069799 | 4/2014 |
| WO | 086487 | 6/2014 |
| WO | 2015137740 | 9/2015 |
| WO | 2017069801 | 4/2017 |
| WO | 2017069813 | 4/2017 |

OTHER PUBLICATIONS

Astrelgroup: "HOTTOH: Electronic solutions for the biomass heating". Mar. 15, 2016 (Mar. 15, 2016), pp. 1-36, Retrieved from the Internet: URL: http://www.astrelgroup.com/wp-content/uploads/2016/06/80H000011R1.1_Hottoh-Catalogue_EN_20160315.pdf[retrieved on Mar. 9, 2017].

"Char-Broil Operations Guide English French", 15.125115 VESCONN 2015 Grilling Guide Eng.indd, Jan. 19, 2016, pp. 1-20.

"SmartChef Grill Guide English Spanish", 17.125395 Smart Chef Grill.indd, Sep. 27, 2016. pp. 1-16.

Non-Final Office Action for U.S. Appl. No. 15/510,996 dated May 11, 2018.

International Search Report for application No. PCT/US2016/026736 dated Jul. 8, 2016.

International Search Report for application No. PCT/US2016/024737 dated Jul. 8, 2016.

Craig Goldwyn, "The Zen of Wood" May 1, 2008, <www.amazingribs.com>, accessed online at <web.archive.org/web/20080501010952/http://www.amazingribs.com/ti[s_and_technique/zen_of_wood_html>.

SmartThings, "Easy & Affordable Smart Home Automation" retireved from http://www.smartthings.com on Feb. 26, 2018, 5 pages.

SmartThings Product, retrieved from http://www.smartthings.com/prduct/ on Feb. 26, 2018, 9 pages.

SmartThings Hub, retireved from https://shop.smartthings.comM/products/smarthings-hub on Feb. 26, 2018, 16 pages.

SmartThings GE Light & Appliance Plug-and-ControlPower Outlet, retireved from https://shop.smartthings.com#!/products/ge-z-wave-wireless-lighting-control-lamp-module on Feb. 26, 2018, 14 pages.

Quirky, "Shop for products invented by real people" retireved from http://www.quirky.com on Feb. 26, 2018, 1 page.

Quirky Pivot Power Genius, retrieved from http://www.quirky.com/shop/633-pivot-power-genius-power-control-from-your-smartphone on Feb. 26, 2018, 6 pages.

Quirky Sptter, retrieved from http://www.quirky.com/shop/609-spotter-multi-prupose-sensor on Feb. 26, 2018, 4 pages.

Electric Imp, "Connectivity Made Simple" retrieved from http://electricimp.com/ on Feb. 26, 2018, 2 pages.

Electric Imp Product, retrieved from http://electricimp.com/product/ on Feb. 26, 2018, 3 pages.

Electric Imp, "The Interactive imp: how to manage communication between app, agent and device" retrieved from http://electricimp.com/docs/resources/interactive/ on Feb. 26, 2018, 11 pages.

Electric Imp Lockitron, retrieved from http://electricimo.com/productgallery/lockitron/ on Feb. 26, 2018, 2 pages.

Electric Imp. "Flow to run an imp offline: Making-and breaking-Internet connections" retrieved from http://eletricimp.com/docs/resources/offline/ on Feb. 26, 2018, 9 pages.

(56) References Cited

OTHER PUBLICATIONS

Electric Imp, Inc. "specification: imp001 version 20140226" http://www.electricimp.com/ (2014) 14 pages.
Electric Imp, Inc. "specification: imp002 version 20140226" http://www.electricimp.com/ (2014) 18 pages.
Murata Manufacturing Co., Ltd. "WiFi Module Data Sheet, Broadcom BCM43362 WiFi + ST Micro STM32F405 MCU, Tenative P/N: LBWA1ZV1CD-716" http://electricimp.com/docs/attachments/hardware/datasheets/imp003_LBWA1ZV1CD_060314.pdf Feb. 26, 2018, 24 pages.
Crock-Pot, Coming Soon! Crockpot® Smart Slow Cooker enabled with WeMo™ retrieved from http://www.crock-pot.com/slow-cookers/coming-soon%21-crock-pot%C2%AE-smart-slow-cooker-enabled-with-wemo%E2%84%A2/SCCPWM600-V1.html on Feb. 26, 2018, 8 pages.
Ttdadmin, 'DADO & Partners Take Home Top Awards at Home Electronics Shows', in DADO [online]. Posted Mar. 16, 2015 [retrieved on Jul. 6, 2018]. Retrieved from the Internet: <URL:http://dadolabs.com/march2015awards/>.
Ttdadmin, 'Saber, Char-Broil and DADO Make Outdoor Cooking Smart at Ces', in DADO [online]. Posted Jan. 7, 2015 [retrieved on Jul. 6, 2018]. Retrieved from the Internet: <URL:http://dadolabs.com/saberandcbatces/>.
Monitor All Aspects of Grill Performance From Your Smart Phone [online] Saber Grills, 2015 [retrieved on Jul. 6, 2018]. Retrieved from the Internet: <URL:https://sabergrilss.com/Edge/index.html>.
Get Cookin' —Our Favorite Grills', in Modem in Denver [online]. Posted Jun. 1, 2015 [retrieved on Jul. 6, 2018]. Retrieved from the Internet: <URL:https://www.modernindenver.com/2015/06/grills/>.
Ttadmin, 'Product Showcase: Char-Broil® Simple Smoker with SmartChef™ Technology, in DADO [online]. Posted Mar. 25th, 2016 [retrieved on Jul. 6, 2018]. Retrieved from the Internet: <URL:http://dadolabs.com/charbroil-simple-smoked>.
'Products', in DADO [online]. [retrieved on Jul. 6, 2018] Retrieved from the Internet: <URL:http://dadolabs.com/category/products/>.
Good, Max. 'Saber Edge Grill Review', in Amazing Ribs [online]. [retrieved on Jul. 6, 2018]. Retrieved from the Internet: <URLhttps://amazingribs.com/grill/saber-edge-grill-review>.
Welcome to Life Lived on the Edge, in Edge: A Smarter Barbecue [online]. Posted Sep. 8, 2015 [retrieved on Jul. 8, 2018]. Retrieved from the Internet: <URL:https://www.sabergrills.com/Edge/features.html>.
Ttadmin, 'Smarter Cookouts With IoT-Enabled Grills', in DADO [online]. Posted May 7 2015 [retrieved on Jul. 6, 2018] Retrieved from the Internet: <URL:http://dadolabs.com/smartercookoutswithiot/>.
Tasarra-Twigg, Noemi. 'The Saber Edge Smart Grill: Hi-tech BBQ', in Apple Gazette [online]. Posted Mar. 17, 2015 [retrieved on Jul. 6, 2018]. Retrieved from the Internet: <URL:http://www.applegazette.com/accessories-2/the-saber-edge-smart-grill-hi-tech-bbq/>.
Daugherty, Trevor. 'With summer approaching, SABER introduces the iPhone connected EDGE smart grill', in 9TO5Toys [online]. Posted Mar. 16, 2015 [retrieved Jul. 6, 2018]. Retrieved from the Internet: <URL:https://9to5toys.com/2015/03/16/sbaer-edge-iphone-connected-grill/>.
Screen Captures from YouTube video clip entitled "Network Setup on a Char-Broil Electric Smoker with Smartchef Technology", 5 pages, uploaded on Nov. 18, 2018 by user "Char-Broil Grills". Retrieved from Internet: <https://www.youtube.com/watch?v=bEt9_bLasas>.
Screen captures from YouTube video Clip entitled "Saber Edge Grill", 3 pages, uploaded on Apr. 5, 2015 by user "Max Good". Retrieved from Internet: <https://www.youtube.com/watch?v=mLZobNHMXbo>.

\* cited by examiner

CLOUD SYSTEM FOR CONTROLLING OUTDOOR GRILL WITH MOBILE APPLICATION

CROSS-REFERENCE TO RELATED APPLICATIONS

The present invention is a continuation of U.S. patent application Ser. No. 15/511,319, filed on Mar. 15, 2017, which is a U.S. National Stage of PCT Application No. PCT/US16/26736 filed on Apr. 8, 2016, which claims the benefit of priority to U.S. Provisional Application No. 62/245,549, filed on Oct. 23, 2015. The present invention is also a continuation-in-part of U.S. patent application Ser. No. 15/510,996, which is a U.S. National Stage of PCT Application No. PCT/US16/24737 filed on Mar. 29, 2016, which claims the benefit of priority to U.S. Provisional Application No. 62/245,535, filed on Oct. 23, 2015. The present invention is also a continuation-in-part of U.S. patent application Ser. No. 15/114,744, which is a U.S. National Stage of PCT Application No. PCT/US16/39271, filed on Jun. 24, 2016, which claims the benefit of priority to U.S. Provisional Application No. 62/245,530, filed on Oct. 23, 2015. The entire content of each of the aforementioned patent applications is incorporated herein by reference.

BACKGROUND

Outdoor appliances have long been used to prepare food and perform other tasks. For example, outdoor appliances such as grills and smokers are often used to prepare meats, vegetables, fruits, and other types of food. These grills and smokers are typically operated using manual controls that are integrated into the frame of the grill or smoker. For example, many such outdoor appliances have an ignition button that, when pressed, generates a spark near a gas outlet on a burner. The spark ignites the gas and the burner begins to create heat. The amount of heat is generally controlled using a dial or nob that allows more or less gas to be introduced at the burner.

In some cases, the outdoor appliances may have electronic controls. Thus, instead of having a manual dial to adjust the amount of gas being introduced at the burner, an electrical control is set or adjusted by the user. The electrical control then interacts with a solenoid or other electromechanical component to regulate the flow of gas to the burner. Still, however, as is the case with manual dials and nobs, the user of the outdoor appliance has to be present at the grill to make changes to settings on the grill.

To overcome this problem, some newly-manufactured outdoor appliances have been equipped with Bluetooth radios. These Bluetooth radios allow communication with nearby electronic devices including cell phones or tablets of the appliance's owner. Range limitations to the Bluetooth radio, however, necessitate that the user of the appliance still be within a certain proximity of the appliance. Once outside this proximity, the user no longer has any communication with the appliance, and thus cannot control any functionality related to the appliance. Moreover, even when connected to a mobile device, the appliance has very limited options as to what can be controlled over Bluetooth. Indeed, the appliance has no access to any information or control signals beyond the user's mobile device.

BRIEF SUMMARY

Embodiments described herein are directed to communicating with and controlling operation of electronically-controlled appliances. In one embodiment, a provided computer system includes the following: a receiver that receives inputs from computing systems including a first input indicating that an electronically-controlled appliance is permitted to communicate with the cloud computing platform. The computer system further includes a notification generator that generates notifications that are to be sent to software applications. The software applications are configured to control functions of the electronically-controlled appliance.

The computer system further includes a transmitter that sends generated notifications to the software applications. A generated notification may indicate that the cloud computing platform is communicably connected to the electronically-controlled appliance. The receiver receives a second input from the software application indicating that various functions are to be performed on the electronically-controlled appliance. In response, the transmitter sends instructions to the electronically-controlled appliance to perform the specified functions. These functions are then interpreted and carried out by a hardware controller on the electronically-controlled appliance.

In another embodiment, a computer system performs a method for controlling an electronically-controlled appliance including receiving a first input from a computing system indicating that an electronically-controlled appliance is permitted to communicate with a cloud computing platform. The computer system generates a notification that is to be sent to a software application, where the software application is configured to control functions of the electronically-controlled appliance. The computer system transmits the generated notification to the software application, where the generated notification indicates that the cloud computing platform is communicably connected to the electronically-controlled appliance. The computer system then receives a second input from the software application indicating that specified functions are to be performed on the electronically-controlled appliance, and transmits instructions to the electronically-controlled appliance to perform the specified functions. These functions are then interpreted and carried out by a hardware controller on the electronically-controlled appliance.

In yet another embodiment, a cloud computing platform is provided for communicating with and controlling operation of electronically-controlled appliances. The cloud computing platform includes the following: a receiver that receives inputs from other computing systems including a first input indicating that an electronically-controlled appliance is permitted to communicate with the cloud computing platform. The receiver receives a second input indicating that specified functions are to be performed by the electronically-controlled appliance. Within the cloud computing platform, a control signal generator is provided which generates control signals that are to be sent to the electronically-controlled appliance. The control signals are configured to control functions of the electronically-controlled appliance according to the received second input. A transmitter is also provided within the cloud computing platform which transmits the generated control signals to the electronically-controlled appliance for performance of the specified functions. The functions are then interpreted and carried out by a hardware controller on the electronically-controlled appliance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
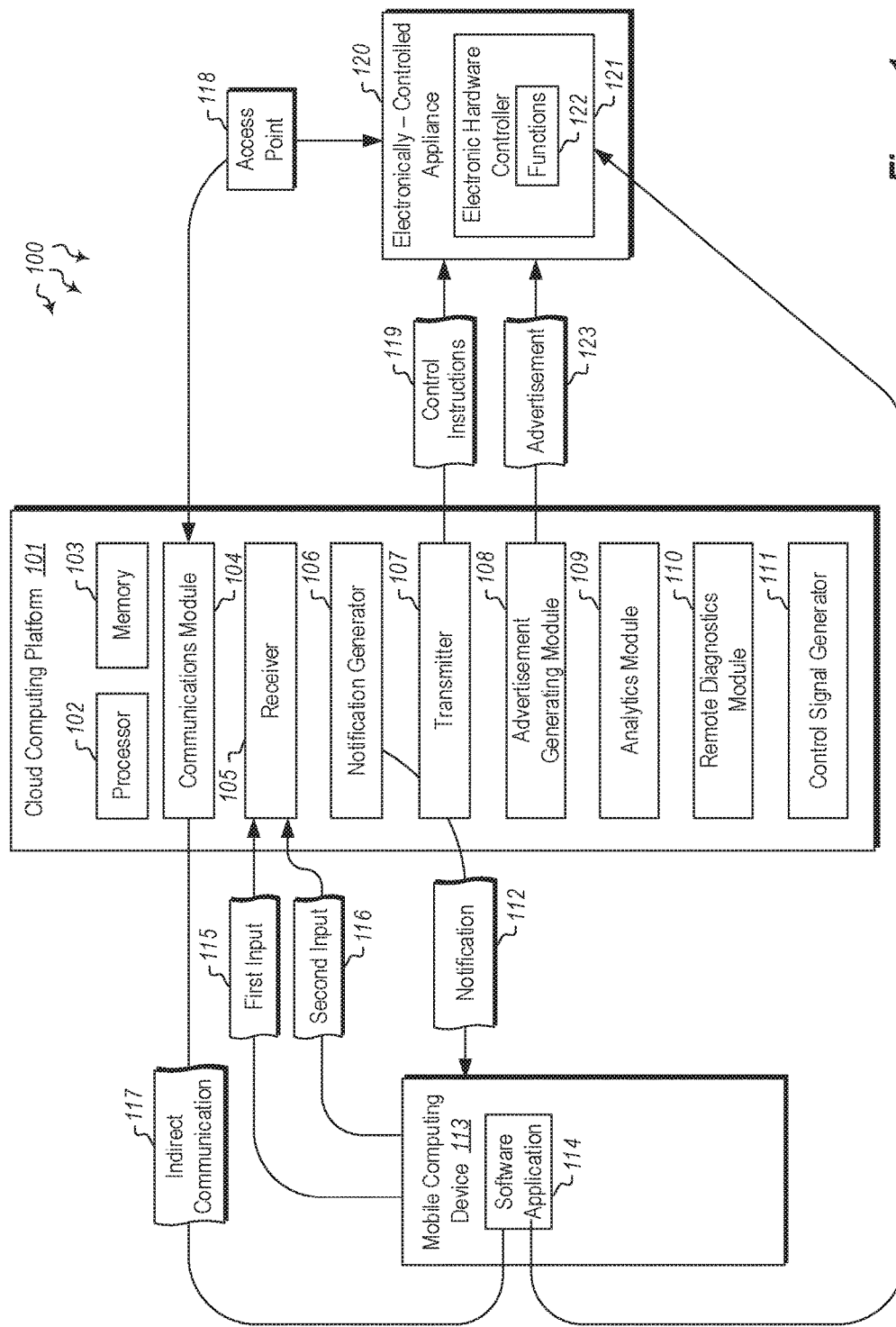
FIG. 1 illustrates a computer architecture in which embodiments described herein may operate including communicating with and controlling operation of electronically-controlled appliances.

Embodiments described herein are directed to communicating with and controlling operation of electronically-controlled appliances. In one embodiment, a provided computer system includes the following: a receiver that receives inputs from computing systems including a first input indicating that an electronically-controlled appliance is permitted to communicate with the cloud computing platform. The computer system further includes a notification generator that generates notifications that are to be sent to software applications. The software applications are configured to control functions of the electronically-controlled appliance.

The computer system further includes a transmitter that sends generated notifications to the software applications. A generated notification may indicate that the cloud computing platform is communicably connected to the electronically-controlled appliance. The receiver receives a second input from the software application indicating that various functions are to be performed on the electronically-controlled appliance. In response, the transmitter sends instructions to the electronically-controlled appliance to perform the specified functions. These functions are then interpreted and carried out by a hardware controller on the electronically-controlled appliance.

In another embodiment, a computer system performs a method for controlling an electronically-controlled appliance including receiving a first input from a computing system indicating that an electronically-controlled appliance is permitted to communicate with a cloud computing platform. The computer system generates a notification that is to be sent to a software application, where the software application is configured to control functions of the electronically-controlled appliance. The computer system transmits the generated notification to the software application, where the generated notification indicates that the cloud computing platform is communicably connected to the electronically-controlled appliance. The computer system then receives a second input from the software application indicating that specified functions are to be performed on the electronically-controlled appliance, and transmits instructions to the electronically-controlled appliance to perform the specified functions. These functions are then interpreted and carried out by a hardware controller on the electronically-controlled appliance.

In yet another embodiment, a cloud computing platform is provided for communicating with and controlling operation of electronically-controlled appliances. The cloud computing platform includes the following: a receiver that receives inputs from other computing systems including a first input indicating that an electronically-controlled appliance is permitted to communicate with the cloud computing platform. The receiver receives a second input indicating that specified functions are to be performed by the electronically-controlled appliance. Within the cloud computing platform, a control signal generator is provided which generates control signals that are to be sent to the electronically-controlled appliance. The control signals are configured to control functions of the electronically-controlled appliance according to the received second input. A transmitter is also provided within the cloud computing platform which transmits the generated control signals to the electronically-controlled appliance for performance of the specified functions. The functions are then interpreted and carried out by a hardware controller on the electronically-controlled appliance.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or removed without impacting the core system.

Referring to the figures, FIG. 1 illustrates an environment 100 in which at least one embodiment described herein may be employed. The environment 100 includes a cloud computing platform 101. The cloud computing platform 101 may include any number of local or distributed computer systems. The cloud computing platform 101 includes at least one hardware processor 102 and physical system memory 103. The cloud computing platform 101 further includes modules for performing a variety of different functions.

For instance, the communications module 104 may be configured to communicate with other computing systems (e.g. mobile computing device 113). The communications module 104 may include any wired or wireless communication means that can receive and/or transmit data to or from other computing systems such as wired or wireless network interface cards. The communications module 104 may be configured to interact with databases, mobile computing devices (such as mobile phones or tablets), electronically-controlled appliances (e.g. 120), embedded computing systems or other types of computing systems.

In one embodiment, the cloud computing platform 101 may be configured to communicate with mobile computing device 113 (e.g. a smart phone, laptop, tablet or wearable device) and/or with electronically-controlled appliance 120. The mobile computing device 113 may also be able to communicate with the electronically-controlled appliance 120, either directly or through the cloud computing platform 101. The electronically-controlled appliance 120 may be any type of appliance or device that is electronically-controlled. For example, any device that is controlled by an electronic hardware controller 121 would be an electronically-controlled appliance 120. The electronic hardware controller 121 may include computer memory that has instructions stored thereon for controlling the appliance or device.

In one example embodiment, the electronically-controlled appliance 120 is a grill or smoking appliance, although the embodiments described herein are not limited to such. The grill/smoker may be operated by the electronic hardware controller 121. The controller 121 may be configured to control temperature, control cooking cycles, control fuel burn rate, monitor ambient temperature, or perform other functions. In some cases, the electronic hardware controller 121 may include or be communicatively connected to a radio such as a Bluetooth or WiFi radio that can wirelessly communicate with other computing systems (e.g. 101 and 113). The electronic hardware controller 121 may control these communications, and may present a display to a user. The display may include a variety of information, including a graphical user interface (GUI) that allows interaction from an appliance user.

The cloud computing platform 101 may be configured to interact with the electronically-controlled appliance 120 through the communications module 104. The cloud computing platform 101 further includes a receiver for receiving inputs from the mobile computing device 113. A software application 114 running on the mobile computing device 113 may include a GUI for controlling the electronically-controlled appliance 120. The GUI may provide various notifications, alerts, buttons, fields, prompts or other elements that allow monitoring and control of the electronically-controlled appliance 120.

In one embodiment, the cloud computing platform 101 is provided for communicating with and controlling operation of electronically-controlled appliances such as appliance 120. The cloud computing platform 101 has hardware elements including a processor 102, memory 103, a receiver 105, a transmitter 107, various communication radios in the communications module 104, and other hardware elements. The receiver 105 may be configured to receive inputs from computing systems (including mobile computing device 113) such as first input 115 indicating that an electronically-controlled appliance is permitted to communicate with the cloud computing platform 101.

The cloud computing platform 101 also includes a notification generator 106 configured to generate notifications (e.g. 112) that are to be sent to software applications such as software application 114 running on mobile computing device 113. The software application 114 may be configured to control functions 122 of the electronically-controlled appliance 120. A transmitter 107 is also part of the cloud computing platform 101. The transmitter 107 may be configured to send a generated notification 112 to software application 114, where the notification indicates that the cloud computing platform 101 is communicably connected to the electronically-controlled appliance 120.

The receiver 105 may then receive a second input 116 from the software application 114 indicating that certain functions are to be performed on the electronically-controlled appliance 120. Upon receiving such an input, the transmitter sends control instructions 119 to the electronically-controlled appliance 120 to perform the specified functions. The functions are then interpreted and carried out by an electronic hardware controller on the electronically-controlled appliance 120 according to the control instructions 119.

These control instructions 119 may include, for example, an indication that a certain amount of fuel pellets are to be added to a smoker's combustion area, or that a specified amount of fuel (such as propane) is to be burned by a grill, or that a specified internal temperature is to be reached and maintained. The software application 114 may send a notification of availability to the cloud computing platform 101 to indicate whether the electronically-controlled appliance 120 is available or not to receive such control instructions 119.

If the notification of availability indicates that the electronically-controlled appliance 120 is currently available to receive instructions, the software application 114 may provide a user interface for a user to interact with. Through this user interface, the user can control the appliance 120. The user interface may provide many different functions 122 that are controllable using the user interface. As mentioned above, these functions 122 may include substantially any function that the electronically-controlled appliance 120 is capable of (or is modified to be capable of) performing. For grill and smokers, this may include controlling burn rate, temperature, cooking cycle, fuel dispensing, controlling timers, accessing recipes, displaying probe temperatures or alerts, turning the device on or off, or other functions.

Other electronically-controlled appliances 115 such as ovens, refrigerators, blenders, toasters, dishwashers, coffee machines, mixers, bread makers, washers and dryers or other appliances may also be controlled using the software application 114 in a manner that is the same as or similar to that used to control a grill or smoker. The software application 114 may provide a notification of availability for the appliance 120, and the application may display a user interface for controlling functions of that appliance. As inputs are received from a user, an instruction generator in the application 114 may generate instructions that are specific to the appliance, and that are interpretable and understandable by the appliance 120. These control instructions 119 are then sent to the electronically-controlled appliance 120 to control the functions 122 specified by the user.

In some cases, a user may control whether the electronically-controlled appliance 120 is permitted to communicate with the cloud computing platform 101 or with other computing systems such as mobile computing device 113. The electronically-controlled appliance 120 may send an indication to the cloud computing platform 101, indicating that it wishes to communicate with one or more mobile computing devices 113 (for example, to download a recipe). A user may provide input indicating whether the electronically-controlled appliance 120 is permitted to communicate with the mobile computing device 113 or not. If such communication is permitted by the user, the electronically-controlled appliance 120 may communicate with an access point 118 (such as a router) that permits flow of data between the appliance 120 and the cloud computing platform 101 and/or between the appliance 120 and the mobile computing device 113.

The cloud computing platform 101 further includes an advertisement generating module 108. The advertisement generating module 108 may generate advertisements 123 which are sent to the electronically-controlled appliance 120. The advertisements may be based on the user's use of the appliance, or may be based on a sale that might interest the user (such as a sale on brisket), or may be based on analytics. Indeed, the cloud computing platform 101 includes an analytics module 109 configured to perform analytics on usage data. The analytics module 109 may, for example, perform statistical analyses on usage data received from the appliance 120. Then, based on the statistical analysis, the advertisement generating module 108 can generate an advertisement that would be most likely to be relevant to the user, based on their appliance usage.

Other modules such as the remote diagnostics module 110 and control signal generator 111 may also be included in the cloud computing platform 101. The remote diagnostics module 110 may analyze usage data and determine what problems are currently occurring on the appliance. The remote diagnostics module 110 may also analyze the appliance usage data and determine what problems are likely to occur based on the user's use of the appliance. A control signal generator 111 may be used by the cloud computing platform 101 to generate control instructions 119 that are sent to the electronically-controlled appliance 120 to perform specified functions 122. The control instructions 119 are interpretable by the appliance's electronic hardware controller 121. Once interpreted, the functions are carried out on the appliance according to the instructions 119.

Figure 2:
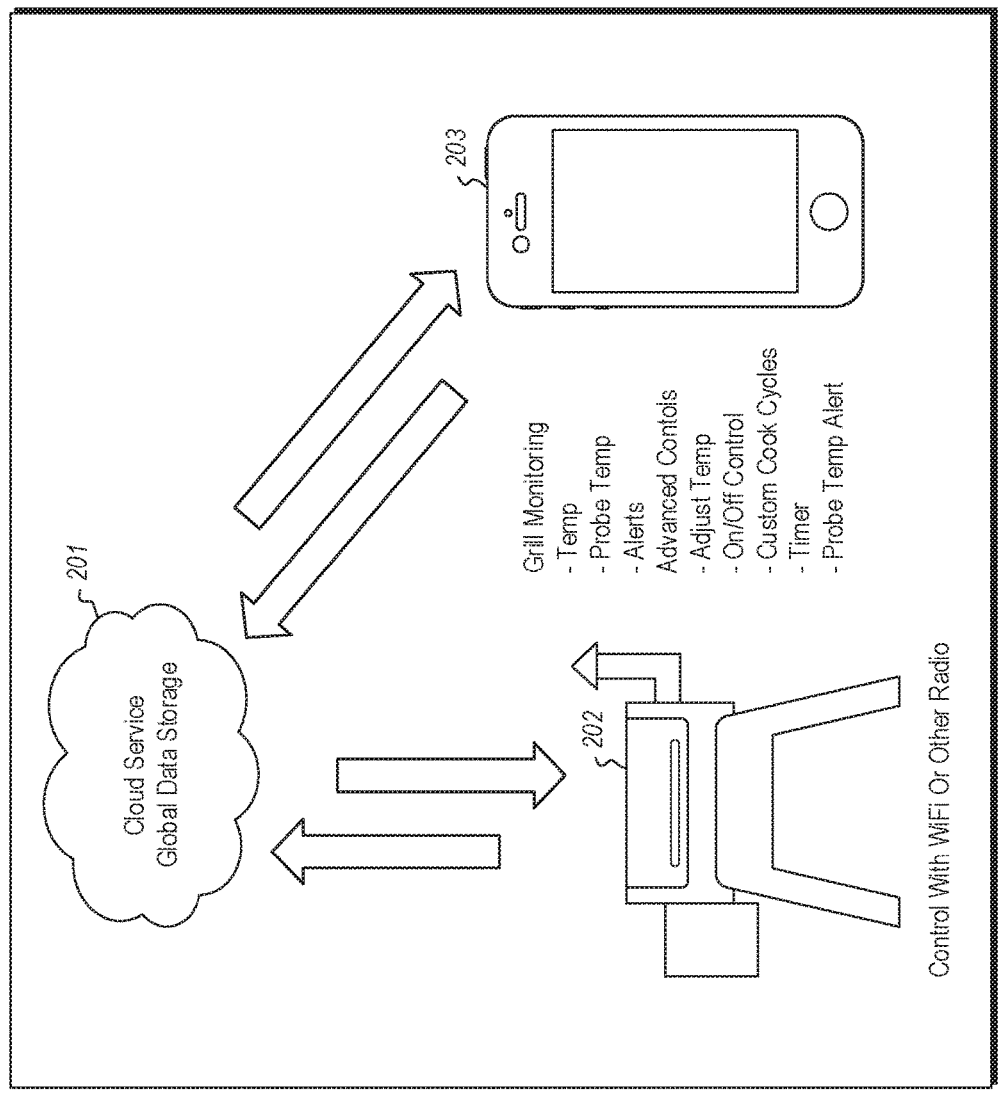
FIG. 2 illustrates an embodiment in which an electronically-controlled appliance is in communication with a cloud service and a mobile electronic device.

FIG. 2 illustrates an embodiment in which a smoker 202 is controlled via a smart phone 203 (or rather via a software application running on the smart phone). The smart phone 203 may communicate with a cloud service 201 which, in turn, communicates with the smoker 202. The cloud service 201 may provide data storage along with other features. The data storage may store, for example, recipes used by the smoker 202 to smoke meats, vegetables, fruits or other food items. Using the cloud service 201, a customer or user may use their phone 203, tablet, laptop, desktop or other computer system to control the functions of the smoker 202.

The functionality may include smoker/grill monitoring including monitoring of the internal temperature, external ambient air temperature, probe temperature (e.g. from probes that communicate wirelessly), and alerts that may be raised by the grill or smoker. Other controls may include adjusting the temperature by adding more fuel, or allowing the existing fuel (such as pellets) to burn down so as to reduce the temperature, turning the device on or off or turning certain components on or off, controlling the timer or custom cooking cycles, or monitoring probe temperature alerts. Many more controls may be provided on the smart phone 203, and the amount and type of controls may be updated over time to add new functionality.

As control inputs are received at the smart phone 203 (or other electronic device), they are passed to the cloud service 201 via a wired or wireless data transmission. The control inputs are then passed to the smoker/grill 202 directly or via an access point such as a WiFi router. In this manner, a user may be able to control their smoker/grill from substantially any location that has internet access. In some cases, the user may even be able to ignite the smoker/grill 202 remotely, while in other cases, such functionality may be disabled unless the user is within a specified distance of the grill, as determined by a GPS or Bluetooth geofence.

Figure 3:
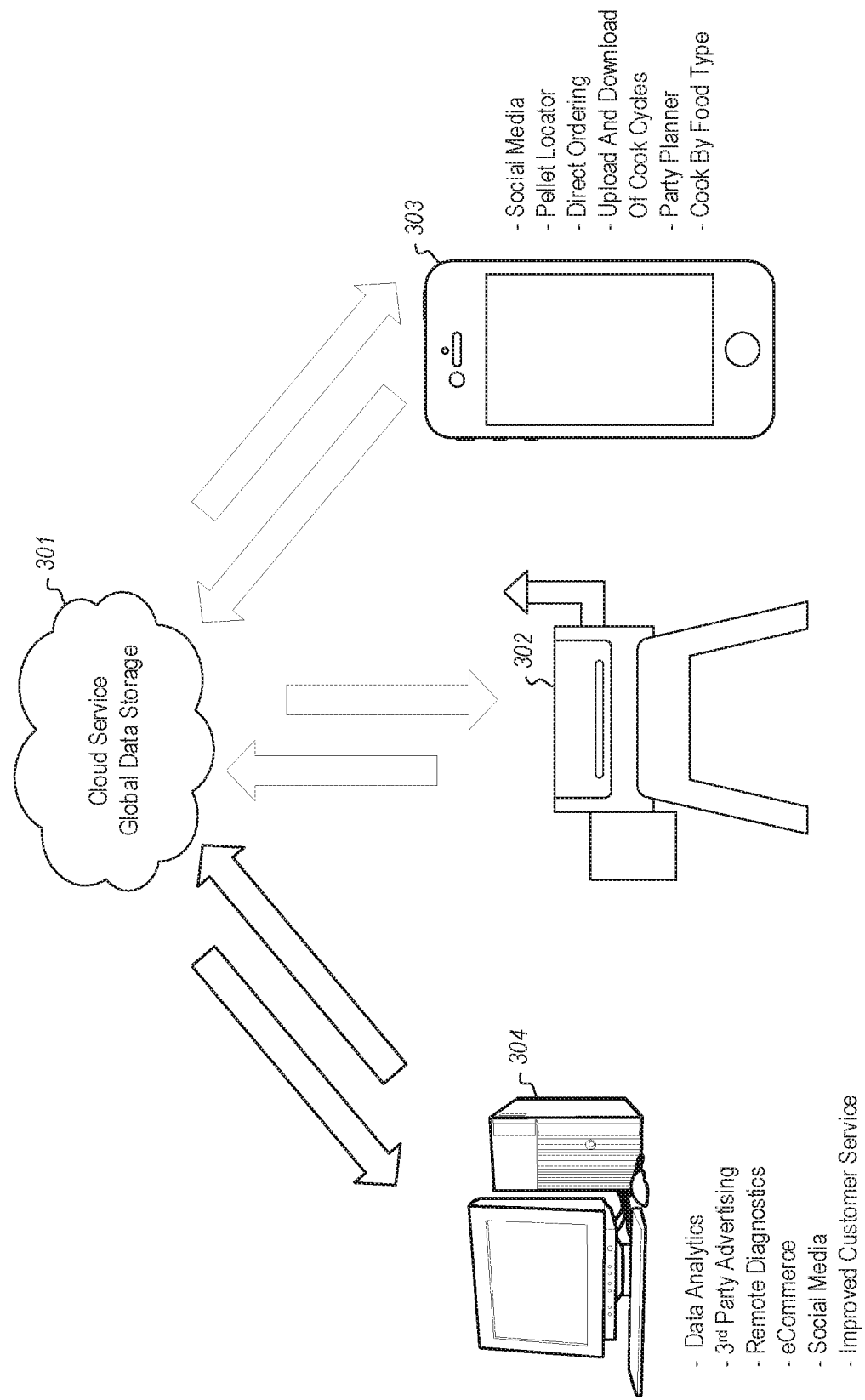
FIG. 3 illustrates an embodiment in which an electronically-controlled appliance is in communication with a cloud service and a mobile electronic device, and is further in communication with analytics, social media or other third party systems.

FIG. 3 illustrates an environment similar to that of FIG. 2 in which a cloud service 301 links various devices including a smoker/grill 302 and a smart phone 303 or other electronic computing device. The cloud service 301 is also connected to various other services and systems including, but not limited to, data analytics, third party advertising, remote diagnostic services, eCommerce services, social media, customer service assistance and others. For example, usage data for the smoker/grill 302 may be uploaded to the cloud service 301 and stored in the global data storage.

This usage data (such as when the smoker was turned on, how long was it turned on, what temperature did it reach, what was the average internal temperature, what was the average external temperature, what cooking/smoking recipe was used, what controls were used and when or other operational usage data) may be analyzed by an analytics engine in combination with data from other users. As such, usage data from many different users may be logged and analyzed to identify broad patterns of use. These analytics may then be used to refine and improve future smokers or grills, or may be used for other purposes such as providing advertising.

In one example, the cloud service may track users' usage of the smoker/grill, and may determine which products or recipes may be of interest to a given user based on similarities between their usage of the grill and other's usage. The usage data may also be used to perform remote diagnostics of the smoker/grill 302. For instance, the usage data may indicate that a user's grill temperature exceeded a normal operating temperature (e.g. due to a grease fire). As such, certain parts may have failed or may be likely to fail due to the extreme heat. Other usage data may indicate different problems that may be likely to occur as a result of how the user is using their grill. Usage data may also be sent to social media announcing successful implementation of a recipe, or announcing to party guests that a specified meat is smoking and will be ready at a certain time. Many other social media implementations may also be used as provided by the cloud service 301.

Figure 4:
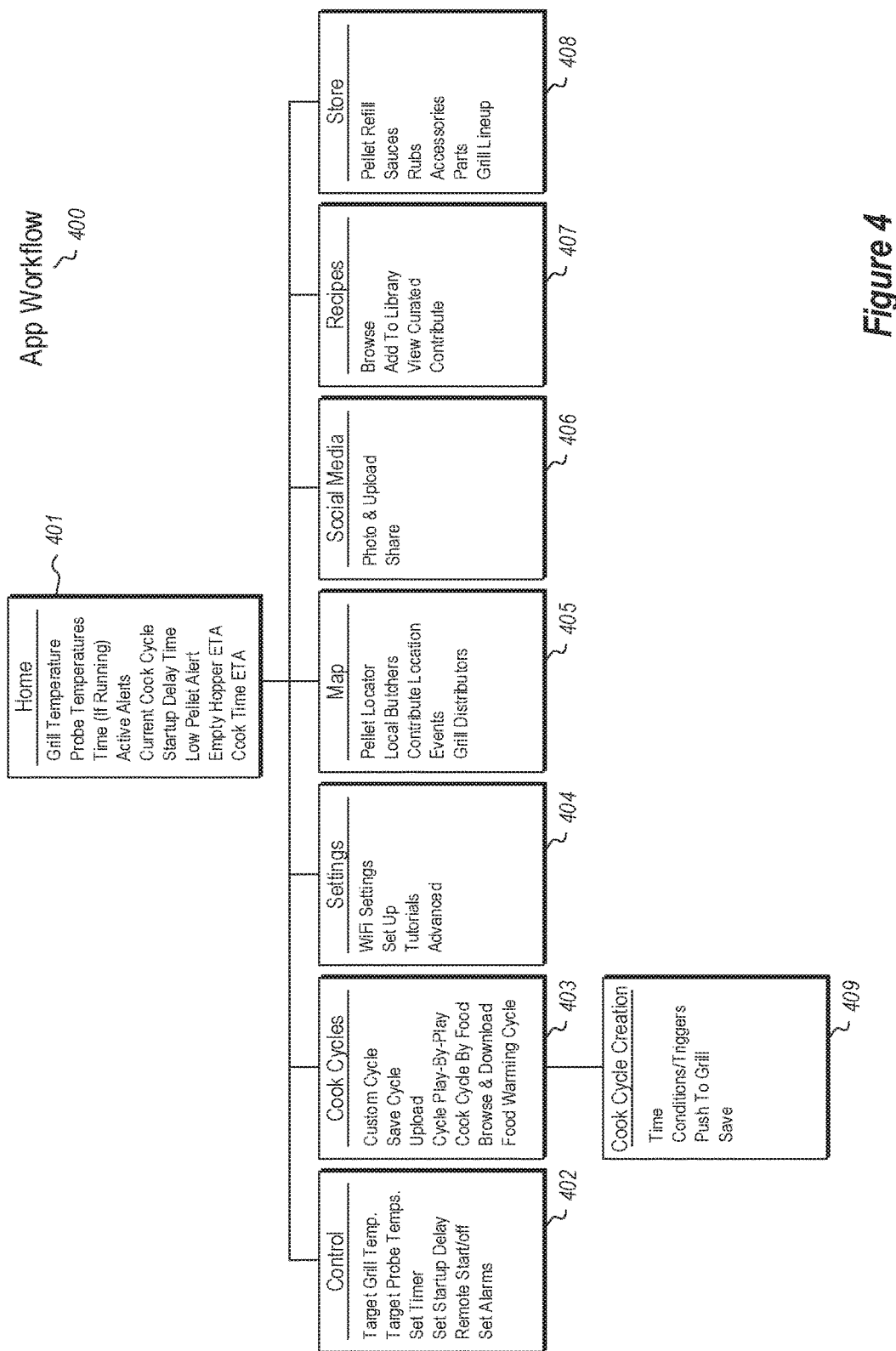
FIG. 4 illustrates an embodiment of a software application functionality hierarchy.

FIG. 4 illustrates an application workflow 400 for a software application such as application 114 of FIG. 1. The application may run on a mobile device such as a phone or tablet or wearable device, or may be run on a desktop computing system or may be run through a web browser. It will be understood that the application workflow 400 is one example of an application workflow, and other embodiments and implementations are possible.

The application workflow 400 includes a home menu 401 that, on launch, shows the status of the grill (or other electronically-controlled appliance), the status of any probes in use, the status of any timers in use and any alerts. A first time setup may walk a user through connecting the grill to an access point (such as a WiFi access point), and linking the mobile device to the grill. The first time setup may also take the user through a tutorial on how to use the grill, or at least certain components of the grill. The home menu 401 may show any or all of the following: grill temperature, probe temperature, timer (if running), active alerts (e.g. a low pellet alert or an empty hopper alert), current cook cycle, current cook time-to-completion, startup delay time, or other information.

The application may have many different tabs and menus, including one or more of the following: a control menu 402 that allows users to control the grill's target temperature, control the grill's target probe temperatures, set or restart timers, set startup delays, remotely start or turn grill off, set alerts or perform other functionality. A cook cycles menu 403 may be provided which allows users to select from different cooking cycles (i.e. pre-programmed cooking routines that control temperature for a specified amount of time to cook or smoke the food item in a certain manner), save cooking cycles, upload cooking cycles to a cloud service (e.g. 301 of FIG. 3), provide the user a play-by-play indicator of what is occurring during a cooking cycle, implement a certain cook cycle for a given food, browse and download recipes and/or cook cycles, provide access to a food warming cycle that keeps the food at a certain temperature for a specified time, or perform other functions.

The cook cycles menu 403 may have one or more submenus including a cook cycle creation menu 409. The cook cycle creation menu 409 may allow a user to create his or her own custom cooking cycle. The custom cooking cycle can specify a given time to begin and end, a certain temperature to hold or change to throughout the cycle, various customizable triggers or conditions that may cause changes to the cooking cycle such as shortening or lengthening the cooking time, or increasing or decreasing internal grill temperature for a given length of time. The cook cycle creation menu 409 may allow a user to push the customized cooking cycle to the grill and have the grill begin implementation of the cycle. This customized cooking cycle may also be saved directly on the grill or in the cloud service 301.

Other menus provided on the application workflow may include a settings menu 404. The settings menu may allow a user to set up WiFi, Bluetooth or communication means on the grill. The settings menu 404 may also allow configuration settings to be accessed and changed. The settings menu 404 may further provide tutorial as well as other appliance- or application-specific settings that may be changed using the settings menu. A map menu or tab 405 may be provided which gives access to local retailers including pellet sellers or distributors, local butchers or farms for meat or vegetables, local events including barbeques or tailgate parties, or locations of nearby grill distributors. The map menu 405 may also provide other information that is specific to the appliance, such as a repair shop that specializes in repairs for that appliance.

A social media menu 406 may be provided which allows users to upload photos, recipes, videos or other media which may be of interest to other users. The social media tab may allow the user to post images or status updates to social media websites, including location pins, updates from the grill itself or other information. As such, the social media menu 406 allows users to share their grilling/smoking experience with others.

A recipes menu 407 allows users to browse recipes available online or through the cloud service 301. When browsing these recipes, the user may select to download the recipes to their phone or other device. These recipes can be collected in a library and shared via social media. Users can sort the recipes, add their own recipes, add pictures to others' recipes or otherwise interact with the recipe database. A store menu 408 allows a user to purchase pellets, propane or other fuel, purchase sauces, rubs, grill accessories, grill parts or full grills/smokers. The store may be expanded to allow the purchase of food items or other items that may be used in conjunction with the grill. The concepts described above will be explained further below with regard to method 500 of FIG. 5.

Figure 5:
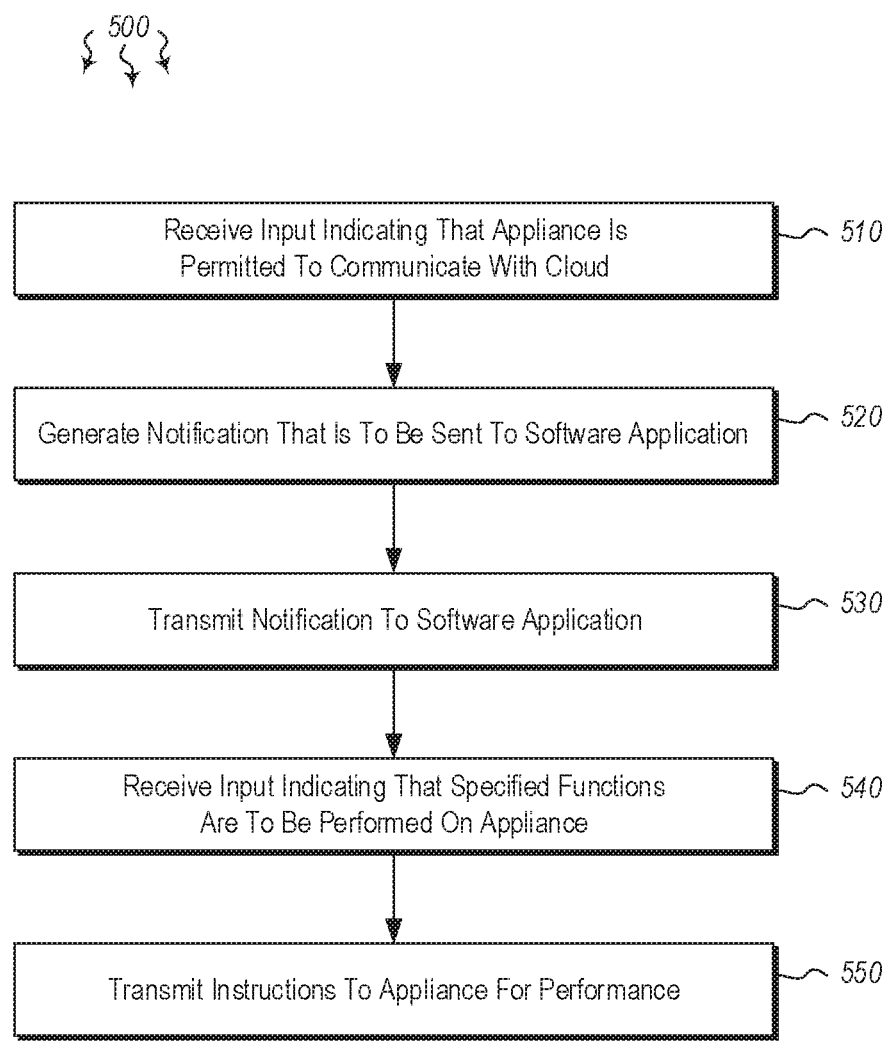
FIG. 5 illustrates a flowchart of an example method for communicating with and controlling operation of electronically-controlled appliances.

In view of the systems and architectures described above, methodologies that may be implemented in accordance with the disclosed subject matter will be better appreciated with reference to the flow chart of FIG. 5. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a flowchart of a method 500 for communicating with and controlling operation of electronically-controlled appliances. The method 500 will now be described with frequent reference to the components and data of environment 100.

Method 500 includes receiving a first input from one or more computing systems indicating that at least a first electronically-controlled appliance is permitted to communicate with a cloud computing platform (510). For example, cloud computing platform 101 may receive first input 115 from mobile computing device 113 indicating that electronically-controlled appliance 120 is permitted to communicate with the cloud computing platform. The cloud computing platform 101 may thus be apprised that the electronically-controlled appliance 120 will be sending data requests to the platform or will otherwise be attempting to communicate with the platform. In some cases, the communication may include requesting to download a recipe or custom cooking cycle.

Method 500 further includes generating a notification that is to be sent to a software application, the software application being configured to control one or more functions of the electronically-controlled appliance (520). The notification generator 106 of the cloud computing platform 101 may generate notification 112 which is sent to be sent to the software application 114 of the mobile computing device 113. The notification 112 indicates that the cloud computing platform is communicably connected to the electronically-controlled appliance 120. After this notification 112 is generated, the transmitter 107 of the cloud computing platform 101 transmits the generated notification to the software application 114 (530).

Method 500 also includes receiving a second input from the software application indicating that one or more specified functions are to be performed on the electronically-controlled appliance (540). For instance, the receiver 105 of the cloud computing platform 101 may receive second input 116 from the mobile computing device 113. The second input specifies functions 122 that are to be performed on the electronically-controlled appliance 120. The functions may include adjusting the temperature by increasing or decreasing burn rate, monitoring internal or external temperatures, monitoring wireless probes, adjusting or setting timers, or performing other functions applicable to the appliance. The transmitter 107 then transmits control instructions 119 to the electronically-controlled appliance 120 to perform the specified functions 122 (550). The functions 122 are interpreted and carried out by an electronic hardware controller on the electronically-controlled appliance 120.

The receiver 105 of the cloud computing platform 101 may further receive portions of data including ambient temperature data for the environment in which the electronically-controlled appliance 120 resides. For example, a grill or smoker may record the ambient air temperature using a temperature sensor on the outside of the appliance. The ambient air temperature may be monitored throughout the cooking cycle, and may lead to a change in operation. For example, the control instructions 119 may be altered by the cloud computing platform 101, prior to transmission to the electronically-controlled appliance 120, to compensate for the ambient air temperature. For instance, on a hotter day, the cooking cycles may be adjusted to avoid overheating the meat or other food, while on a colder day, the cooking cycles may be adjusted upwards to burn hotter so as to maintain the desired temperature. Other adjustments may also be made based on the ambient air temperature.

The electronic hardware controller 121 of the electronically-controlled appliance 120 may be configured to receive food temperature data from a digital thermometer. The digital thermometer may be communicably connected to the hardware controller 121 of the grill and/or to the cloud computing platform 101. The digital probes may be configured to interact with the cloud computing platform regardless of which grill or other appliance it is used with. In some cases, prior to transmitting the control instructions 119, the cloud computing platform adjusts the control instructions to further include an alert based on the food temperature data.

For instance, the hardware controller 121 may communicate with the digital thermometer, and set alerts based on probe temperature. When the alerts are triggered, the electronic hardware controller 121 communicates with the cloud computing platform 101 and/or the mobile computing device 113. Moreover, a user can use the software application 114 on the mobile computing device 113 to monitor probe temperatures, internal temperatures, and/or ambient temperatures using the software application 114 on the mobile computing device 113.

At least in some embodiments, the cloud computing platform 101 may be configured to communicate directly with the electronically-controlled appliance via an access point 118 within range of the electronically-controlled device 120. A user of the mobile computing device 113 may use the software application 114 to grant permission for the electronically-controlled device 120 to communicate directly with the cloud computing platform 101. As such, the electronically-controlled device 120 may send and receive data from the cloud computing platform 101 through a wired or wireless access point 118. In other cases, the cloud computing platform 101 may communicate with the electronically-controlled appliance 120 through the software application 114 provided on the mobile computing device 113. The software application 114 relays communications (i.e. indirect communication 117) between the cloud computing platform 101 and the electronically-controlled appliance 120.

In addition to facilitating communication between the mobile device 113 and the electronically-controlled device 120, the cloud computing platform 101 may also provide services such as advertising services. The cloud computing platform 101 includes an advertisement generating module 108 configured to generate advertisements 123 for transmission to the electronically-controlled appliance 120 or to the software application 114 running on the mobile device 113. The advertisement generating module may, for example, access information from local retailers including grocery stores. Based on grill or smoker usage data, the cloud computing platform 101 may determine which ads would be most interesting to a user, and may send those advertisements 123 to the software application 114 or to the grill directly. The advertisements 123 may be tailored for users of the electronically-controlled appliance 120 based on usage information for the user and potentially based on nearby user's appliance usage.

Indeed, the cloud computing platform 101 may receive usage data from many different electronically-controlled devices including device 120. This usage data may be used for a variety of purposes, including generating targeted advertising. The usage data may also be used by the analytics module 109. The analytics module 109 may be configured to analyze the usage data associated with the electronically-controlled appliances and generate appliance-related analytics for the electronically-controlled appliance(s). The usage data may include wattage drawn by a hot rod, time turned on, temperature (internal and external), indications of how the user cooks, when they cook, what recipes they use, etc. The analytics data may generally show, for a specific user or for a grouping of users, how the users are using their grills or other appliances.

In one example, the analytics data is used to verify or void a warranty claim. For instance, if a user had a grease fire in the grill causing the internal temperature to exceed 800 degrees Fahrenheit, the cloud computing platform 101 would know what had occurred, and would know that the warranty was voided due to the excessive temperature. Contrariwise, if a user makes a warranty claim and their usage has been within normal parameters, the warranty claim may be verified and fulfilled.

The cloud computing platform 101 may further include a remote diagnostics module 110 that is configured to perform remote diagnostics on the electronically-controlled appliance 120. The remote diagnostics module 110 may access the user's usage data to predict failures for certain components of the electronically-controlled appliance 120. If the appliance has been mistreated or heavily used in a certain manner, the remote diagnostics module 110 may be able to determine that a component failure is likely and may prompt the user (via a display on the grill such as that shown in FIG. 6 or via the software application 114) to replace the component or at least indicate that a failure may be imminent. The remote diagnostics module 110 may also be able to determine why a given part isn't working based on the appliance's usage information.

Figure 6:
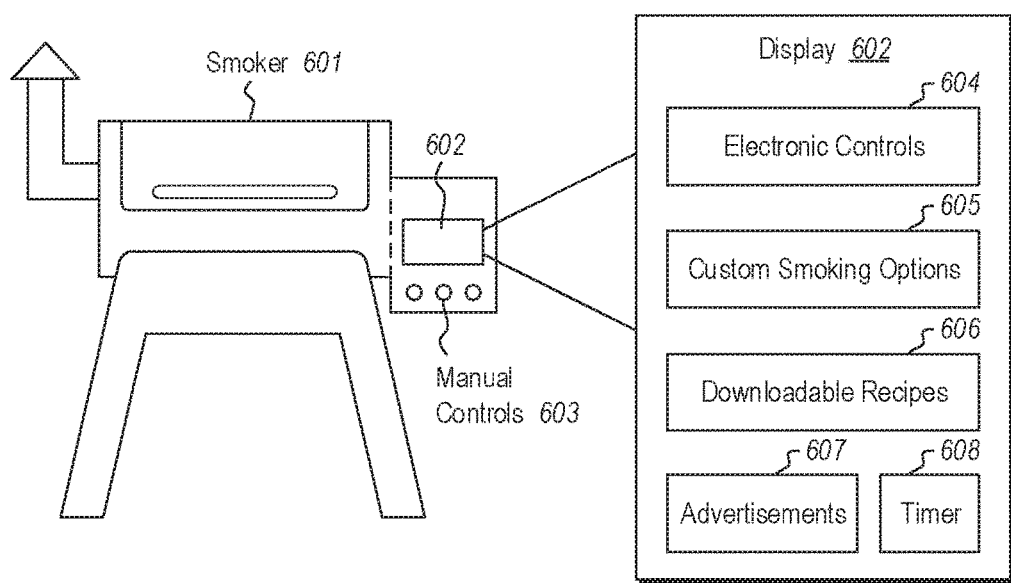
FIG. 6 illustrates an embodiment of a display that is part of an electronically-controlled smoker appliance.

FIG. 6 illustrates an embodiment of a smoker 601 which is an electronically-controlled device. The smoker 601 has one or more manual controls 603 such as buttons or knobs, as well as a display 602. The display may be a touchscreen display that allows a user to provide input. The display 602 may include electronic controls such as buttons or sliders or input fields that allow users to adjust settings on the smoker 601. One input field may be a "Custom Smoking Options" field 605 that allows users to input their own customized smoking cycles or modify existing smoking cycles. These smoking cycles may apply to certain meats or to certain recipes and may be used to achieve a certain result. The display 602 may include other controls including a "Downloadable Recipes" button 606 that allows users to download recipes directly to the smoker 601 through the access point 118 or through the software application 114. The display 602 may also include a place to display advertisements 607, a timer 608, or other items which may be useful to an appliance user.

Additionally or alternatively, an embodiment of a cloud computing platform is provided (e.g. 101 of FIG. 1) for communicating with and controlling operation of electronically-controlled appliances (e.g. 120). The cloud computing platform 101 has a hardware processor 102, a receiver 105 configured to receive inputs from other computing systems including a first input 115 indicating that the electronically-controlled appliance 120 is permitted to communicate with the cloud computing platform. The receiver 105 also receives a second input 116 indicating that various specified functions 122 are to be performed by the electronically-controlled appliance 120.

The cloud computing platform 101 also includes a control signal generator 111 configured to generate control instructions 119 that are to be sent to the electronically-controlled appliance 120. The control instructions 119 are configured to control functions 122 of the electronically-controlled appliance 120 according to the second input 116. The platform 101 also includes a transmitter 107 that transmits the generated control instructions 119 to the electronically-controlled appliance 120 for performance of the specified functions 122. These functions are then interpreted and carried out by an electronic hardware controller 121 on the electronically-controlled appliance 120.

In some cases, the cloud computing platform 101 may further include or be communicatively connected to a data store in which recipes, custom smoking patterns, and user appliance usage data are stored. The cloud computing platform 101 may be configured to access selected recipes from the data store and generate control signals for the electronically-controlled appliance according to the recipe. Indeed, the control signal generator 111 may generate control instructions 119 based on a recipe, such that the food is smoked by the appliance 120 according to a smoke pattern specified in the recipe.

In this manner, a user can simply load a recipe on his or her mobile device 113 and provide that recipe to the cloud computing platform 101 where the control signal generator 111 will automatically access the recipe, generate control instructions 119 and send them to the electronically-controlled appliance 120. The appliance's hardware controller will then receive the control instructions, interpret them and carry them out. Accordingly, as a result of the control instructions, the grill/smoker may ignite and begin a smoking cycle, a timer may be set, alerts may be established and other fuel may begin to be fed into the combustion area. As such, multiple physical and computer-related results may occur based on the user's input at the mobile device 113. At least in some cases, these control instructions 119 may be overridden by the manual controls (603 of FIG. 6) or by the electronic controls 604.

In some embodiments, the cloud computing platform 101 may be configured to access user appliance usage data from a data store. The platform 101 may then use this usage data to generate advertisements 123 for the appliance user based on the appliance usage data, and further transmit the generated advertisements to the electronically-controlled appliance 120 or to a software application 114 running on the user's mobile electronic device 113. The advertisements may be tailored to the user, or may be general announcements that may be of interest to owners of that appliance.

Accordingly, methods, systems and computer program products are provided which communicate with and control operation of electronically-controlled appliances. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A cloud computing platform for communicating with and controlling operation of an electronically-controlled appliance comprising an outdoor barbecue grill or outdoor barbecue smoker, the cloud computing platform having at least one hardware processor, the cloud computing platform comprising:
   a receiver configured to receive inputs from one or more computing systems including at least a first input indicating that an electronically-controlled appliance is in network communication with the cloud computing platform, the electronically-controlled appliance comprising an outdoor barbecue grill or outdoor barbecue smoker;
   a notification generator configured to generate notifications that are to be sent to one or more software applications being executed at a mobile device, the one or more software applications being configured to control one or more functions of the electronically-controlled appliance;
   a transmitter configured to send at least one generated notification to at least one of the software applications selected from the one or more software applications, the generated notification indicating that the cloud computing platform is communicably connected to the electronically-controlled appliance;
   the receiver receiving a second input from the at least one software application indicating that one or more specified functions are to be performed on the electronically-controlled appliance; and
   the transmitter sending one or more instructions to the electronically-controlled appliance to perform the one or more specified functions, the functions being interpreted and carried out by a hardware controller on the electronically-controlled appliance.

2. The cloud computing platform of claim 1, wherein the cloud computing platform communicates directly with the electronically-controlled appliance via an access point within range of the electronically-controlled appliance.

3. The cloud computing platform of claim 1, wherein:
   the cloud computing platform communicates with the electronically-controlled appliance through a software application provided on another computing system; and
   the software application is configured to relay communications between the cloud computing platform and the electronically-controlled appliance.

4. The cloud computing platform of claim 1, further comprising an advertisement generating module configured to generate advertisements for transmission to the electronically-controlled appliance or to a software application running on a mobile device.

5. The cloud computing platform of claim 4, wherein the advertisements are tailored for users of the electronically-controlled appliance based on usage data received from the electronically-controlled appliance, wherein the usage data comprises at least one of digital probe information, duration of use, and amount of power drawn from components of the electronically-controlled appliance.

6. The cloud computing platform of claim 1, wherein the cloud computing platform receives one or more portions of usage data from the electronically-controlled appliance.

7. The cloud computing platform of claim 6, further comprising an analytics module configured to:
   analyze the usage data associated with the electronically-controlled appliance; and
   generate one or more appliance-related analytics for the electronically-controlled appliance;
   wherein the usage data comprises digital probe information, duration of use, and amount of power drawn from components of the electronically-controlled appliance.

8. The cloud computing platform of claim 7, wherein the analytics data is used to verify or void warranty claims.

9. The cloud computing platform of claim 7, further comprising a remote diagnostics module that is configured to perform remote diagnostics on the electronically-controlled appliance.

10. The cloud computing platform of claim 9, wherein the remote diagnostics module is configured to predict failures for one or more components of the electronically-controlled appliance.

11. The cloud computing platform of claim 10, wherein the transmitter is configured to transmit one or more notification messages to:
    the electronically-controlled appliance; or
    a software application running on a mobile device regarding the predicted component failures.

12. A cloud computing platform for communicating with and controlling operation of an electronically-controlled appliance comprising an outdoor barbecue grill or outdoor barbecue smoker, the cloud computing platform having at least one hardware processor, the cloud computing platform comprising:
    a receiver at the cloud computing platform configured to receive inputs from one or more mobile devices including at least a first input indicating that the electronically-controlled appliance is in network communication with the cloud computing platform;
    wherein the one or more mobile devices have previously established an initial, direct connection with the electronically-controlled appliance, and wherein the one or more mobile devices and the electronically-controlled appliance maintain independent connections to the cloud computing platform over the internet;

the receiver at the cloud computing platform receiving a second input from the one or more mobile devices indicating that one or more end user specified functions are to be performed by the electronically-controlled appliance;

a control signal generator configured to generate control signals that are to be sent to the electronically-controlled appliance, the control signals being configured to control functions of the electronically-controlled appliance according to the received second input; and a transmitter configured to transmit the generated control signals directly to the electronically-controlled appliance over the internet for performance of the one or more specified functions received from the one or more mobile devices, the functions being interpreted and carried out by a hardware controller on the electronically-controlled appliance.

13. The cloud computing platform of claim 12, further comprising:

a data store;

wherein the data store stores:

recipes, custom smoking patterns, and user appliance usage data, including cooking temperature, ambient temperature, cooking duration, and power usage of the electronically-controlled appliance; and control instructions both for groups of related electronically-controlled appliances, as well as control instructions for individual electronically-controlled appliances distinguished by unique identifiers.

14. The cloud computing platform of claim 13, wherein the cloud computing platform is further configured to:

access one or more selected recipes from the data store in response to a message received over the internet indicating a user selection made at the one or more mobile devices; and generate and send one or more control signals over the internet to the electronically-controlled appliance according to the recipe, such that the electronically-controlled appliance smokes the food according to at least one smoke pattern specified in the recipe.

15. The cloud computing platform of claim 13, wherein the cloud computing platform is further configured to:

receive user appliance usage data directly from the electronically-controlled appliance over the internet;

access one or more portions of the user appliance usage data from the data store;

generate one or more advertisements for the user based on the appliance usage data; and transmit the one or more generated advertisements to at least one of the one or more mobile devices over the internet.

16. A method for remotely controlling an electronically-controlled appliance comprising an outdoor barbecue grill or outdoor barbecue smoker via one or more mobile devices and an internet-connected network server, the electronically-controlled appliance having at least one hardware controller, the method comprising:

receiving at a network server of a cloud computing platform a first input from one or more mobile devices, the first input indicating that at least a first electronically-controlled appliance is in network communication with a cloud computing platform, the first electronically-controlled appliance comprising an outdoor barbecue grille or outdoor barbecue smoker;

generating a notification at the network server that is to be sent to a software application being executed at a mobile device, the software application being configured to remotely control one or more functions of the electronically-controlled appliance over the internet;

transmitting the generated notification from the network server to the software application at the mobile device, the generated notification indicating that the cloud computing platform is communicably connected to the electronically-controlled appliance;

receiving at the network server a second input from the software application, the second input indicating that one or more specified functions initiated by the user on the mobile device are to be performed on the electronically-controlled appliance; and transmitting from the network server to the electronically-controlled appliance over the internet one or more instructions to perform the one or more specified functions, the functions being interpreted and carried out by a hardware controller on the electronically-controlled appliance.

17. The method of claim 16, further comprising:

receiving at the network server from the electronically-controlled appliance over the internet one or more portions of data;

wherein the one or more portions of data include ambient temperature data for the environment in which the electronically-controlled appliance resides.

18. The method of claim 17, further comprising the network server altering the instructions, prior to transmitting the instructions over the internet to the electronically-controlled appliance, to compensate for the ambient air temperature data.

19. The method of claim 16, further comprising:

the network server receiving food temperature data from a digital thermometer installed on the electronically-controlled appliance;

wherein the digital thermometer is communicably connected to the cloud computing platform over the internet through the electronically-controlled appliance.

20. The method of claim 19, further comprising:

the network server adjusting the instructions, prior to transmitting the instructions over the internet to the electronically-controlled appliance, to further include an alert based on the food temperature data.

21. The method of claim 16, wherein the network server is connected to the one or more mobile devices and the electronically-controlled appliance over the internet via separate internet connections.

22. The method of claim 16, wherein the network server is connected to the one or more mobile devices and the electronically-controlled appliance over the internet.

23. An outdoor cooking device for use in a cloud computing environment, the outdoor cooking device comprising an electronically-controlled appliance in the form of an outdoor barbecue grill or outdoor barbecue smoker that is configured to implement instructions from a network server of a cloud computing platform, and to relay information to one or more user-controlled mobile devices at a remote location, the outdoor cooking device comprising:

a combustion area; and an electronic hardware controller comprising at least a processor, a temperature sensor for providing grill temperature data, a digital probe for providing food temperature data, a network communication component for communicating over the internet via an access point, and a computer memory having computer-executable instructions stored thereon that, when executed through the electronic hardware controller, cause the outdoor cooking device to perform the following:
- communicate wirelessly via an initial direct connection with a mobile device to link the mobile device with the outdoor cooking device;
- after the initial direct connection with the mobile device, communicate directly with the cloud computing platform over the internet to send a first input indicating that the outdoor cooking device is in network communication with the cloud computing platform, and cause the outdoor cooking device to disconnect from the mobile device;
- after disconnecting from the initial direct connection with the mobile device, receive one or more second inputs from the network server over the internet, the one or more second inputs comprising one or more user selections made on the mobile device regarding control of the outdoor cooking device;
- send usage data over the internet to the network server, wherein the usage data comprises temperature data intended for display on the mobile device, and data intended to be stored at the cloud computing platform but not displayed on the mobile device; and
- adjust temperature of the outdoor cooking device in response to user-selected instructions provided at the mobile device and received at the outdoor cooking device from the network server over the internet.

24. The outdoor cooking device as recited in claim 23, wherein the network communication component comprises one or more radio components for communicating wirelessly over the internet.

25. The outdoor cooking device as recited in claim 23, wherein the outdoor cooking device is further configured to:
- implement a custom cooking cycle received over the internet from the cloud computing platform, the custom cooking cycle having been selected by a user at the mobile device.

26. The outdoor cooking device as recited in claim 23, wherein the outdoor cooking device is further configured to:
- change an amount of fuel in response to mobile device instructions received from the cloud computing platform over the internet.

27. The outdoor cooking device as recited in claim 26, wherein the fuel comprises wood pellets.

28. The outdoor cooking device as recited in claim 23, wherein the outdoor cooking device is further configured to:
- implement one or more user selected recipes selected by a user at the mobile device and received from the cloud computing platform;
- wherein the one or more user selected recipes cause the outdoor cooking device to adjust an amount of fuel to be delivered to the combustion area in response to identification of (i) a particular time interval, and (ii) data identified from the digital probe.

29. The outdoor cooking device as recited in claim 23, wherein the outdoor cooking device is further configured to:
- identify a status of software installed on the electronically-controlled appliance; and
- install an updated version of the software received over the internet from the cloud computing platform.

30. The outdoor cooking device as recited in claim 29, wherein the outdoor cooking device is further configured to:
- send a request to the cloud computing platform upon identifying that the software is out of date;
- wherein the request:
  - informs a user that new operating instructions exist and provides the user with an opportunity to direct an update to the software; or
  - requests the cloud computing system to directly update the outdoor cooking device with the software update over the internet.

* * * * *